United States Patent
Brown et al.

(10) Patent No.: US 9,767,833 B1
(45) Date of Patent: Sep. 19, 2017

(54) WIRE BONDING ELECTRICAL LAPPING GUIDES FOR TAPE HEAD MODULE

(71) Applicant: HGST Netherlands B.V., Amsterdam (NL)

(72) Inventors: Diane L. Brown, San Jose, CA (US);
Glenn P. Gee, San Jose, CA (US);
Darrick T. Smith, San Jose, CA (US);
Hicham M. Sougrati, Elk Grove, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 15/237,345

(22) Filed: Aug. 15, 2016

(51) Int. Cl.
| | | |
|---|---|---|
| G11B 5/265 | (2006.01) |
| G11B 5/105 | (2006.01) |
| G11B 5/31 | (2006.01) |
| G11B 5/008 | (2006.01) |
| G11B 5/127 | (2006.01) |
| G11B 5/10 | (2006.01) |
| G11B 5/48 | (2006.01) |
| G11B 21/16 | (2006.01) |
| G11B 5/29 | (2006.01) |

(52) U.S. Cl.
CPC ........ G11B 5/3169 (2013.01); G11B 5/00813 (2013.01); G11B 5/102 (2013.01); G11B 5/105 (2013.01); G11B 5/1272 (2013.01); G11B 5/29 (2013.01); G11B 5/295 (2013.01); G11B 5/4853 (2013.01); G11B 21/16 (2013.01)

(58) Field of Classification Search
CPC ....... G11B 5/00813; G11B 5/105; G11B 5/29; G11B 5/295; G11B 21/16
USPC ................................................. 360/121, 129
See application file for complete search history.

(56) References Cited

U.S. PATENT DOCUMENTS

| | | | |
|---|---|---|---|
| 7,116,519 B2 | 10/2006 | Koeppe et al. |
| 7,290,325 B2 | 11/2007 | Wu |
| 7,369,369 B1 * | 5/2008 | Meyer ................. | G11B 5/5552 360/294.5 |
| 7,757,383 B2 | 7/2010 | Biskeborn |
| 7,841,069 B2 | 11/2010 | Biskeborn et al. |

(Continued)

OTHER PUBLICATIONS

Author Unknown, ELG device built with 4 terminal calibration, ip.com Prior Art Database, ip,com disclosure No. IPCOM000015185D, original publication date: Sep. 1, 2001, included in Prior Art Database: Jun. 20, 2003 IBM, United States, downloaded from http://priorart.ip.com/IPCOM/000015185.

*Primary Examiner* — Jefferson Evans
(74) *Attorney, Agent, or Firm* — John D. Henkhaus

(57) ABSTRACT

A process for manufacturing a magnetic tape head module involves depositing over a wafer substrate electrical traces from respective electrical lapping guides (ELGs) to an area at an end of a tape head module also formed over the substrate, fabricating a closure adjacent to the tape head module where the closure terminates outside of the area at the end of the tape head module, and electrically connecting the electrical traces to an external circuit using a wire-bonding procedure, thereby electrically connecting each ELG to the external circuit. A plurality of electrical connection pads may be deposited at the area at the end of the tape head module, and each electrical trace electrically connected to one of the pads, where electrically connecting the traces to the external circuit includes wire-bonding the pads to the circuit.

20 Claims, 5 Drawing Sheets

(56) References Cited

U.S. PATENT DOCUMENTS

| | | | |
|---|---|---|---|
| 7,963,023 B2 | 6/2011 | Lau | |
| 8,564,902 B2 * | 10/2013 | Biskeborn | G11B 5/00826 360/121 |
| 9,093,087 B2 * | 7/2015 | Biskeborn | G11B 5/00826 |
| 2003/0123185 A1 * | 7/2003 | Denison | G11B 27/322 360/119.02 |
| 2007/0103812 A1 * | 5/2007 | Biskeborn | G11B 5/102 360/122 |
| 2009/0201613 A1 * | 8/2009 | Biskeborn | G11B 5/00826 360/313 |
| 2012/0074978 A1 * | 3/2012 | Gentrup | G01R 29/0814 324/754.19 |
| 2015/0007430 A1 | 1/2015 | Tan et al. | |

\* cited by examiner

WIRE BONDING ELECTRICAL LAPPING GUIDES FOR TAPE HEAD MODULE

FIELD OF EMBODIMENTS

Embodiments of the invention may relate generally to magnetic tape heads and more particularly to wire bonding electrical lapping guides to an external circuit.

BACKGROUND

In the context of digital data storage, advances in storage capacity and reliability continue to be ever-present design goals. In that context, magnetic tape continues to be a cost-efficient and reliable storage medium for non-volatile data storage. Conventional magnetic tape heads typically include tape head elements, i.e., very small magnetic read-write transducers, formed from films that are deposited over a substrate. Such tape head elements are commonly fabricated using thin film wafer technology, including machining the elements to a desired height by a process referred to as lapping. For magnetic tape heads that have a magneto-resistive reader element, the desired height is commonly referred to as the "stripe height", and for the writer element, the "throat height".

Improvements in magnetic tape head technology are achievable, such as in data storage capacity, based on improvements in tape head manufacturing processes. Precise control of the critical dimensions of the reader element (e.g., the stripe height) and the writer element (e.g., the throat height), by way of lapping, is commonly practiced and is a fundamental manufacturing process. For optimum yield, performance and stability, precise dimensional control over both the reader and/or writer elements is desirable.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF EMBODIMENTS

Embodiments of the invention are generally directed toward a process or method for manufacturing a magnetic tape head module, a magnetic tape head module prepared according to such a process, and a magnetic tape recording and playback device comprising a magnetic tape head module prepared according to such a process. The manufacturing process involves depositing over a wafer substrate one or more electrical traces from respective one or more electrical lapping guides (ELGs) to an area at an end of a tape head module also formed over the substrate, fabricating a closure adjacent to the tape head module wherein the closure terminates outside of the area at the end of the tape head module, and electrically connecting the electrical traces to an external circuit using a wire-bonding procedure thereby electrically connecting each ELG to the external circuit. Embodiments may further include lapping the tape head module using the ELGs for resistance feedback.

Embodiments may include depositing a plurality of electrical connection pads at the area at the end of the tape head module, and electrically connecting each electrical trace to one of the pads, wherein electrically connecting the traces to the external circuit includes wire-bonding the pads to the circuit.

Embodiments discussed in the Summary of Embodiments section are not meant to suggest, describe, or teach all the embodiments discussed herein. Thus, embodiments of the invention may contain additional or different features than those discussed in this section. Furthermore, no limitation, element, property, feature, advantage, attribute, or the like expressed in this section, which is not expressly recited in a claim, limits the scope of any claim in any way.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Figure 1:
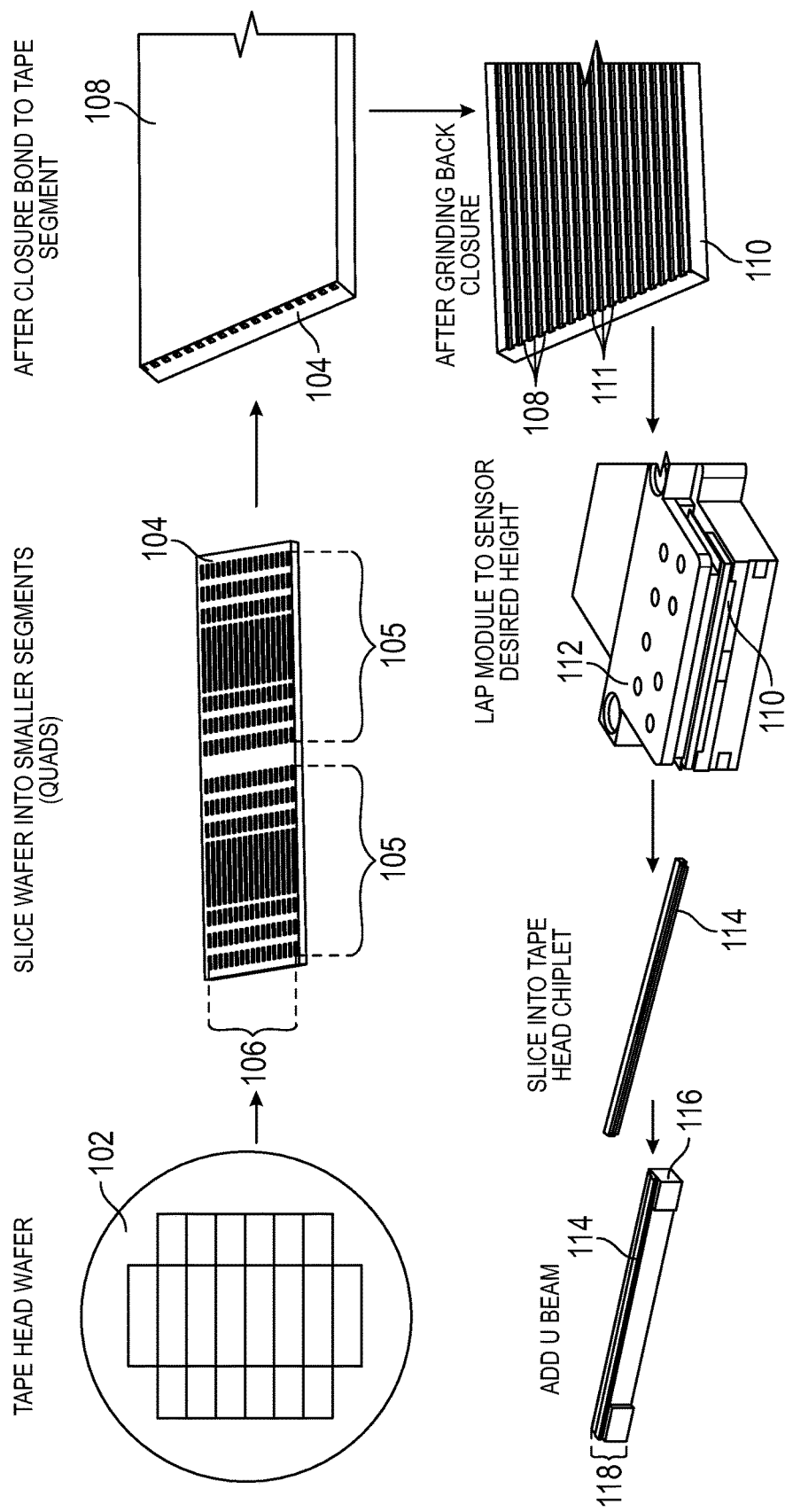
FIG. 1 is a diagram illustrating a process for manufacturing a tape head module, according to an embodiment.

Approaches to manufacturing a magnetic tape head module are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

INTRODUCTION

The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees.

The manufacturing of current magnetic tape head modules typically utilize electrical lapping guide (ELG) feedback, which is described in more detail herein. Implementations of ELGs for a tape head module are historically accomplished by using pogo pins mounted in a pogo pin block, in order to electrically connect the ELGs with a tooling-related printed circuit board (or "lapping PCB"). Although this technology has functioned sufficiently for previous generations of tape head products, it requires high contact forces and precise alignment with the pogo pins (e.g., the ELG electrical connection pads are located in narrow slots between closures) in order to make good electrical contact. For example, typically a minimum force 10 gram per contact is required for good electrical contact, which may be suitable in cases in which the tape head module is attached to a rigid support. However, in order to apply "next generation" lapping, during which the tape head module is effectively bent in order to adjust for multiple stripe heights of the read sensor across the tape head row, and for fine lapping of each respective stripe height across the same row, the aforementioned ELG connection technique is not considered feasible due to the required pogo pin contact force in view of space limitations. Stripe height is an important parameter that affects the signal output (e.g., signal-to-noise ratio, or SNR) of the reader element, e.g., the sensitivity of the reader to a magnetic field. Because the next generation lapping tools/technology can provide much improved stripe height control (e.g., currently on the order of roughly 100× better stripe height control, in the form of lower sigmas across a row), a different technique for electrically connecting the ELGs, which is compatible with this next generation lapping tooling, is desirable.

Tape Head Module Fabrication Process—Generally

High-volume magnetic thin film head fabrication, whether it is for hard disk drive head sliders or for tape head modules, involves high precision subtractive machining performed in discrete material removal steps. In the context of tape head modules, processing starts with a completed thin film head wafer which may consist of thousands of magnetic devices, and is completed when all the devices are individuated and meet numerous and stringent specifications. The individual devices ultimately become part of tape head modules housing a plurality of the magnetic devices, e.g., read-write heads. Therefore, precise control of the reader dimension and of the alignment of the reader and writer relative to each other are critical components of the read-write head fabrication process, in order to achieve optimum yield, performance, and stability.

FIG. 1 is a diagram illustrating a process for manufacturing a tape head module, according to an embodiment. FIG. 1 illustrates the process with a series of images representing a sequence of actions illustrative of the process. The process depicted in FIG. 1 is an example, and an implementation of the process may include additional or fewer actions than that depicted.

Typical magnetoresistive (MR) devices (or "transducers") for use with magnetic tape heads are manufactured using semiconductor type processing methods. FIG. 1 illustrates a wafer 102 on which a plurality of MR devices may be fabricated. The exact configuration of wafer 102 may vary from implementation to implementation, and that illustrated in FIG. 1 is for purposes of a non-limiting example only. For example, multiple rows of devices are deposited simultaneously on a wafer substrate. During the fabrication of the wafer 102, devices and auxiliary circuits are fabricated on a common wafer substrate typically using, for non-limiting examples, deposition, photolithography, etching, and/or lift-off processes. These auxiliary circuits are what are referred to herein as electrical lapping guides (ELGs), or electronic lapping guides.

Wafer 102 is cut into a plurality of segments 104 (sometimes called "quads"), with each segment 104 typically comprising multiple columns 105 (here, two columns) of multiple rows 106 of devices for incorporation into a tape head module.

A segment of closures 108 is fabricated (e.g., using slicing and/or grinding operations) and bonded to a segment 104 of the wafer 102. Once bonded, the segment of closures 108 is typically ground down to fabricate an assembly 110 in which there is a closure between adjacent pairs of rows 106 of devices of the segment 104. A segment of closures 108, once bonded to a segment 104 of devices, ensures proper tape contact on the tape bearing surfaces of the tape head module and may assist with reducing the wear of the transducers during operation. In the assembly 110, the closures 108 define slots 111 in which a row 106 of devices, and aforementioned ELGs, are positioned.

The assembly 110 (i.e., segment 104 with closures 108 affixed thereto) may be fixed to a carrier 112 for rough lapping each row 106 of the tape head modules/devices to target height(s). Upon rough lapping a row 106, the lapped row 106 is sliced off, resulting is an assembly 110 that is reduced in size by one row. This is then repeated until all the rows 106 are rough lapped and sliced off. Alternatively, the assembly 110 may be sliced into rows of tape head modules, e.g., each of the rows 106 is separated, and then fixed to the carrier 112 for lapping the tape head modules/devices to target height(s). Regardless, according to an embodiment, the ELGs are utilized to define the target height of the tape head elements, such as the reader stripe height and/or writer throat height. For non-limiting examples, ELGs may be spaced uniformly along the tape head module or an ELG may be positioned on each side of one or more of the reader and/or writer elements (or elsewhere) and is lapped along with these elements, thereby providing resistive feedback for the lapping process by effectively measuring the element height(s) during the lapping process. According to an embodiment, the rows 106 first undergo an intermediate rough-lap process generally to reach a element height close to or at the target height, and then fine-lapped (or "final lapped" or "final precision-lapped") to reach the target height and/or a desired surface finish. Once lapped, each row 106 may be further trimmed into a tape head chiplet 114, which is bonded or otherwise affixed to a rigid U-beam 116 to form a more robust, stable tape head module for operational use thereof.

Figure 2:
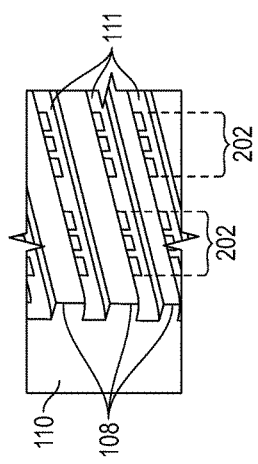
FIG. 2 is a perspective view illustrating an end portion of a conventional segment of devices for incorporation into a tape head module.

FIG. 2 is a perspective view illustrating an end portion of a conventional segment of devices for incorporation into a tape head module. Depicted in FIG. 2 is an assembly such as assembly 110 (FIG. 1) comprising alternating closures 108 and slots 111. Within a slot 111 is depicted multiple ELG electrical connection pads 202 (or simply "ELG pads"). While the closures 108 are beneficial for reasons discussed, the closures 108 tend to complicate the lapping processes because they get in the way of electrically connecting the ELG pads 202 to the lapping PCB. For example, it is extremely challenging, if even possible, to directly connect the electrical connections/pads of a lapping cable (not shown here) with the ELG pads 202 that are located in the slots 111 between closures 108. Thus, the aforementioned pogo pins (e.g., a pogo pin block) are historically used to electrically connect the ELGs with the lapping PCB via the lapping cable and which, as discussed, can inhibit the use of next generation lapping tools/fixtures.

Method for Manufacturing a Tape Head Module

Figure 3A:
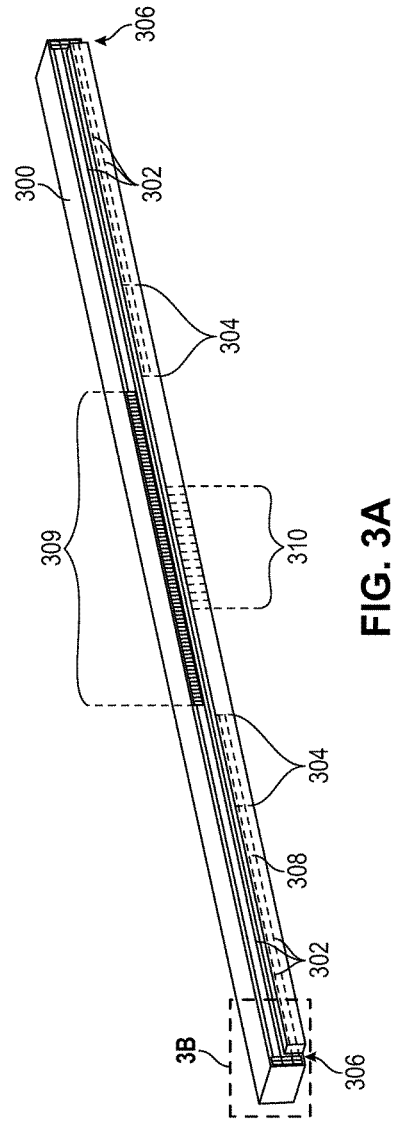
FIG. 3A is a perspective view illustrating a tape head module, according to an embodiment.
Figure 3B:
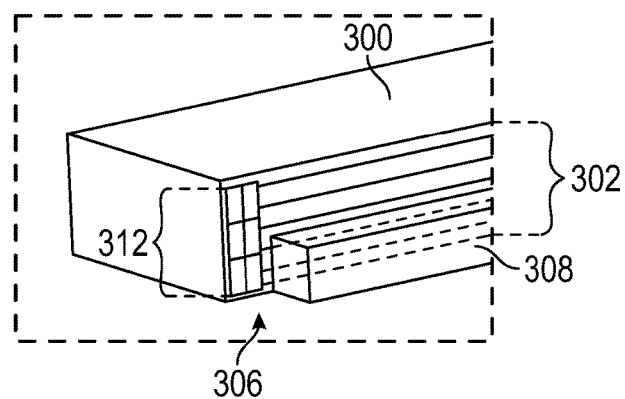
FIG. 3B is a magnified perspective view illustrating an end portion of the tape head module of FIG. 3A, according to an embodiment.
Figure 3C:
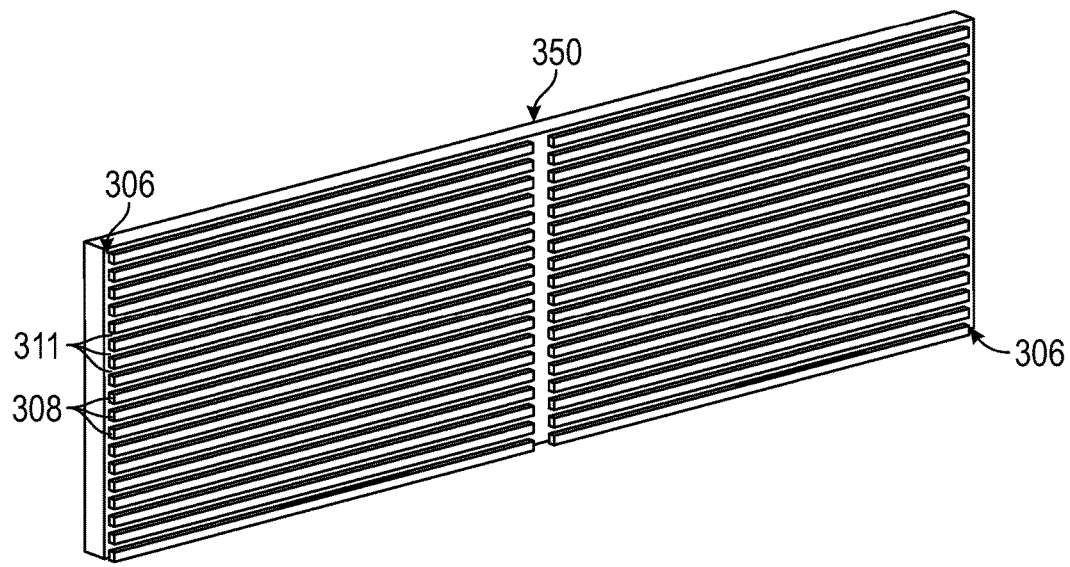
FIG. 3C is a perspective view illustrating a segment comprising a plurality of closures, according to an embodiment.
Figure 4:
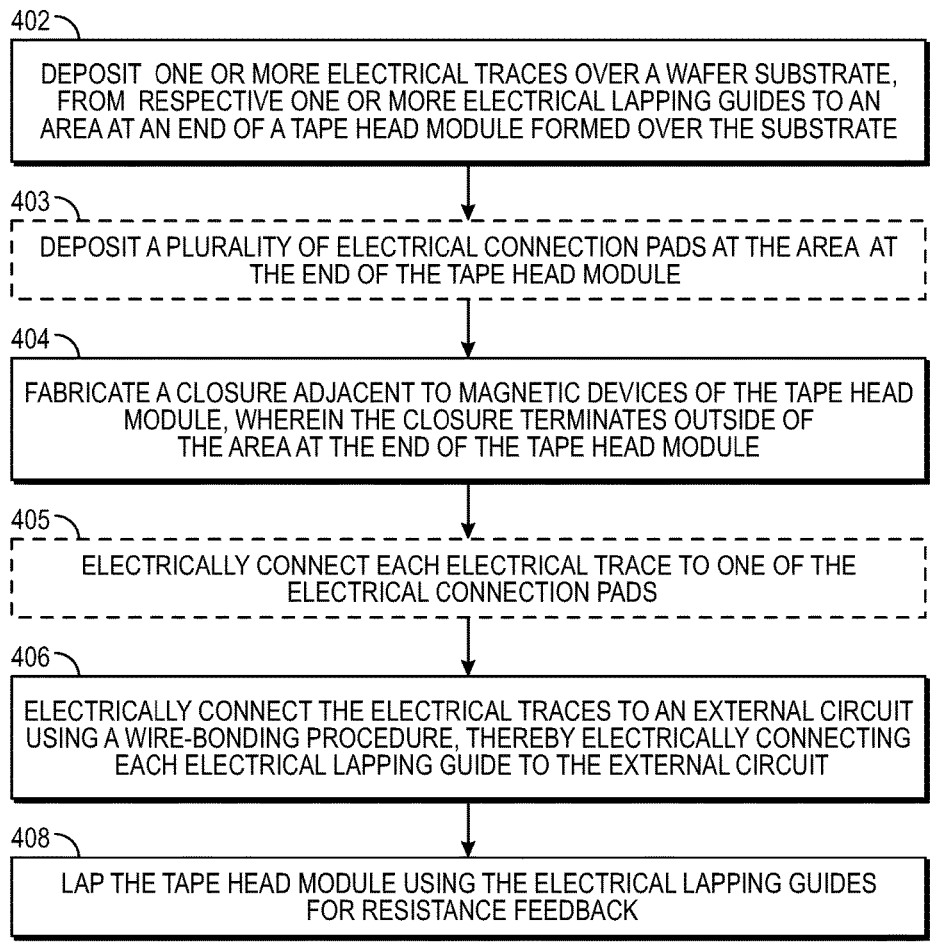
FIG. 4 is a flowchart illustrating a method for manufacturing a tape head module, according to an embodiment.

FIG. 3A is a perspective view illustrating a tape head module, FIG. 3B is a magnified perspective view illustrating an end portion of the tape head module of FIG. 3A, and FIG. 3C is a perspective view illustrating a segment comprising a plurality of closures, all according to embodiments. FIG. 4 is a flowchart illustrating a method for manufacturing a tape head module, according to an embodiment. FIGS. 3A-3C are presented in reference to, and to help describe and illustrate, the method of FIG. 4.

At block 402, one or more electrical traces are deposited over a wafer substrate, from respective one or more electrical lapping guides to an area at an end of a tape head module formed over the substrate. For example and with reference to FIGS. 3A, 3B, electrical traces 302 (depicted in a simplified configuration for example and clarity) are embedded in or on tape head module 300, leading from ELGs 304 (e.g., located under/beneath closure 308; each depicted simply as a vertical dashed line) to an area 306 at the end of the tape head module 300. While electrical traces 302 are depicted visible in FIGS. 3A, 3B, such traces 302 may be embedded in one or more inner layers of the tape head module 300 and not necessarily in the visible outermost layer or surface of tape head module 300 as depicted. The manner in which electrical traces 302 are formed may vary from implementation to implementation. For a non-limiting example, the traces 302 may be deposited in a layer and etched therefrom. Furthermore, the number of ELGs 304 illustrated in FIG. 3A is for purposes of example, where the actual number of ELGs 304 for a given tape head module 300 may vary from implementation to implementation.

At block 404, a closure is fabricated adjacent to magnetic devices of the tape head module, wherein the closure terminates outside of the area at the end of the tape head module. For example, closure 308 is fabricated adjacent to or over a set of magnetic devices 310 (e.g., located under/beneath closure 308; each depicted simply as a vertical dashed line) of the tape head module 300, where each of the magnetic devices 310 is electrically connected to a corresponding electrical connection pad 309. Note that the number of magnetic devices 310 illustrated in FIG. 3A is for purposes of example, where the actual number of magnetic devices 310 for a given tape head module 300 may vary from implementation to implementation. FIG. 3C depicts a segment 350 comprising a plurality of closures 308 (not all pointed to with element number lead lines) bonded or otherwise affixed to the segment 350 of tape head modules (see, e.g., segment 104 of FIG. 1), with slots 311 between adjacent closures 308. Note from FIGS. 3A-3C that closure 308 does not span the entire length of the tape head module 300, but terminates outside of or prior to the area 306 at the end of the tape head module 300.

At block 406, the electrical traces are electrically connected to an external circuit using a wire-bonding procedure, thereby electrically connecting each electrical lapping guide to the external circuit. Wire bonding is a well-established technique for interconnecting integrated circuits (IC) or other semiconductor devices, and may be used in conjunction with vision alignment techniques such as machine vision.

Figure 5:
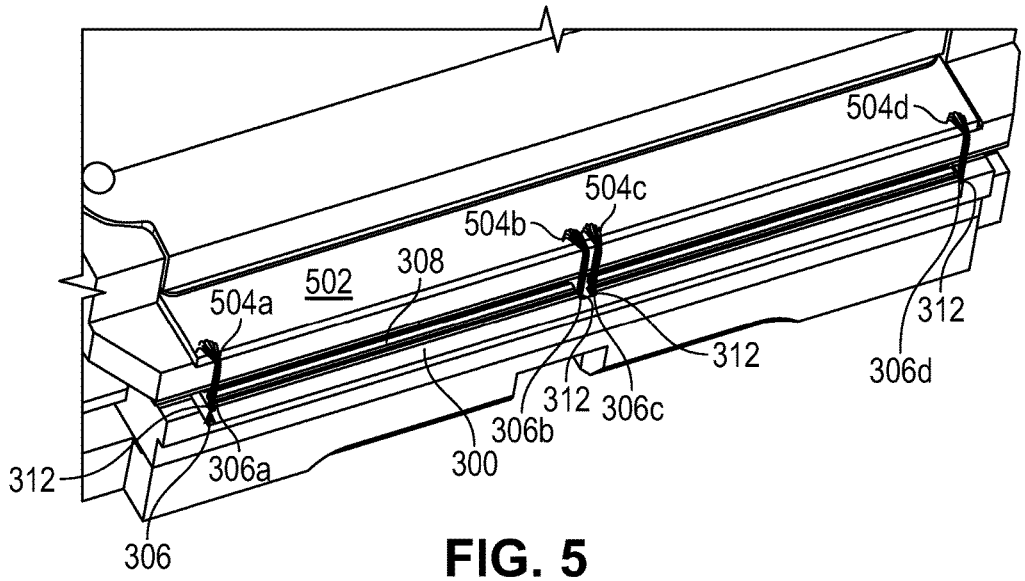
FIG. 5 is a perspective view illustrating a tape head module rough-lap tooling configuration, according to an embodiment.

FIG. 5 is a perspective view illustrating a tape head module "rough-lap" tooling configuration, according to an embodiment. With reference to FIG. 5, tape head module 300, comprising a closure 308 terminating outside of the area 306 at the end of tape head module 300, is installed in a tooling fixture (or "carrier"), and electrically connected to an external circuit 502 using a plurality of wire bonds 504a, 504b, 504c, 504d from electrical connection pads 312 at respective areas 306a, 306b, 306c, 306d at the end of each tape head module 300.

Figure 6:
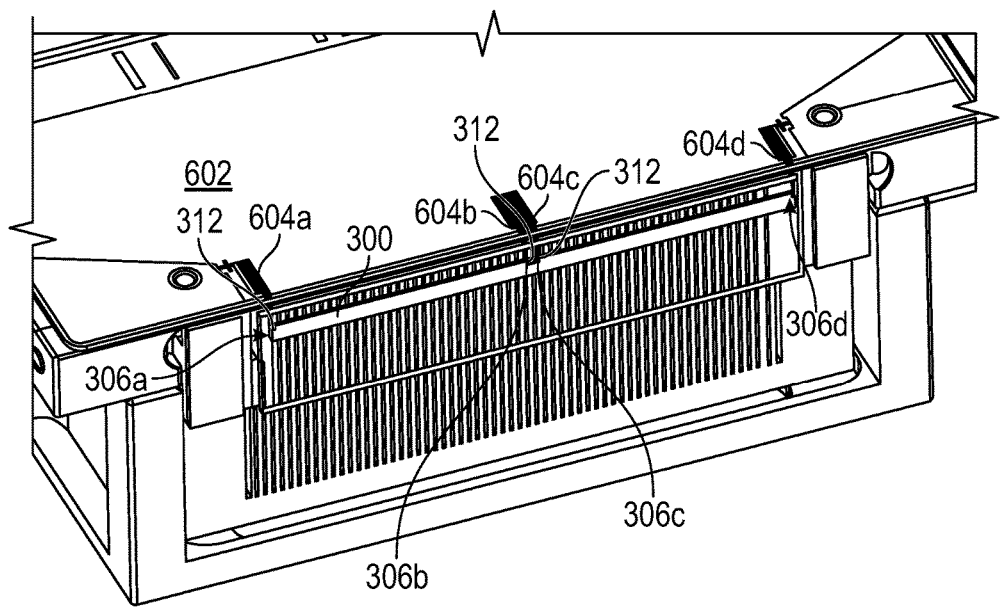
FIG. 6 is a perspective view illustrating a tape head module fine-lap tooling configuration, according to an embodiment.

FIG. 6 is a perspective view illustrating a tape head module "fine-lap" tooling configuration, according to an embodiment. With reference to FIG. 6, and similarly to FIG. 5, tape head module 300, comprising a closure 308 terminating outside of the area 306 at the end of tape head module 300, is installed in a tooling fixture (or "carrier"), and electrically connected to an external circuit 602 using a plurality of wire bonds 604a, 604b, 604c, 604d from electrical connection pads 312 at respective areas 306a, 306b, 306c, 306d at the end of each tape head module 300.

At block 408, the tape head module is lapped using the electric lapping guides for resistance feedback. According to an embodiment, and with reference to FIG. 5, a rough-lap procedure is performed on the pair of tape head modules 300, using ELGs 304 (FIG. 3A) for resistance feedback. For example, the resistance of each ELG 304 is monitored during the lapping procedure to determine the stripe height of the associated magnetic devices 310 (FIG. 3A), with the lapping procedure programmed to terminate when the ELG 304 resistance (e.g., individually or collectively) reaches a predetermined value corresponding to a target stripe height of the magnetic devices 310. According to an embodiment, and with reference to FIG. 6, a fine-lap procedure is performed on the pair of tape head modules 300, using ELGs 304 (FIG. 3A) for resistance feedback. Similarly as with the rough-lap procedure of FIG. 5, the resistance of each ELG 304 is monitored during the lapping procedure to determine the stripe height of the associated magnetic device 310 (FIG. 3A), with the lapping procedure programmed to terminate when the ELG 304 resistance reaches a predetermined value corresponding to a target stripe height of the magnetic devices 310.

It is noteworthy that with prior tape head module fabrication processes, such as those using rigid support and pogo pins to electrically connect the ELGs to the PCB, the rough-lap procedure relied on the ELGs for resistance feedback while the fine-lap procedure was a "blind-lap", i.e., a procedure having no feedback but typically subject to a predetermined duration. By contrast, implementation of embodiments described herein provides access to the space needed to wire-bond ELGs to the PCBs for both the rough-lap and fine-lap procedures, thereby providing more reliable and better performing lapping procedures, as well as the opportunity to use "next generation" fine-lap equipment that can lap to respective stripe heights for individual magnetic devices within a row of devices (e.g., as depicted in FIG. 6).

Returning now to the method of FIG. 4, at optional block 403, a plurality of electrical connection pads are deposited at the area at the end of the tape head module. For example and with reference to FIG. 3B, electrical connection pads 312 are deposited onto the tape head module 300 (e.g., onto the wafer 102 of FIG. 1) at the area(s) 306 at the end of the module 300, outside of or clear of the closure 308. See also areas 306a, 306b, 306c, 306d of FIGS. 5 and 6, for areas at which electrical connection pads 312 may be located.

At optional block 405, each electrical trace is electrically connected to one of the connection pads. For example, each electrical trace 302 (FIG. 3B) is electrically connected to one of the electrical connection pads 312 (FIG. 3B). Hence, at block 406, wire-bonding the electrical traces 302 to the external circuit (see, e.g., PCB 502 of FIG. 5 and PCB 602 of FIG. 6) would include wire-bonding the electrical connection pads 312 to the external PCBs, because the electrical traces 302 are electrically connected with the electrical connection pads 312, which are wire-bonded (e.g., see wire bonds 504a, 504b, 540c, 504d of FIG. 5 and wire bonds 604a, 604b, 604c, 604d of FIG. 6) to the external PCBs.

EXTENSIONS AND ALTERNATIVES

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A method for manufacturing a magnetic tape head module, the method comprising:
    depositing over a wafer substrate one or more electrical traces from respective one or more electrical lapping guides to an area at an end of said tape head module formed over said substrate;
    fabricating a closure adjacent to magnetic devices of said tape head module, wherein said closure terminates outside of said area at said end of said tape head module; and
    electrically connecting said electrical traces to an external circuit using a wire-bonding procedure, thereby electrically connecting each said electrical lapping guide to said external circuit.

2. The method of claim 1, further comprising:
    depositing a plurality of electrical connection pads at said area at said end of said tape head module; and
    electrically connecting each said electrical trace to one of said electrical connection pads;
    wherein said electrically connecting said electrical traces to said external circuit includes wire-bonding said electrical connection pads to said external circuit.

3. The method of claim 1, further comprising:
    lapping said tape head module using said electrical lapping guides for resistance feedback.

4. The method of claim 3, wherein said lapping comprises a final precision-lapping process.

5. The method of claim 4, wherein said final precision-lapping process fabricates a desired surface finish for said tape head module.

6. The method of claim 3, wherein said lapping comprises an intermediate rough-lapping process.

7. The method of claim 1, wherein at least one of said electrical lapping guides is positioned at a central area of said tape head module.

8. The method of claim 1, further comprising:
    depositing over said wafer substrate one or more electrical traces from respective one or more electrical lapping guides to a respective area at an end of each of a plurality of tape head modules formed over said substrate;
    slicing said wafer into a plurality of segments including a plurality of said tape head modules;
    fabricating a closure adjacent to magnetic devices of each said tape head module in a segment, wherein each said closure terminates outside of said respective area at said end of each said tape head module; and
    electrically connecting said electrical traces to said external circuit using a wire-bonding procedure, thereby electrically connecting each said electrical lapping guide to said external circuit.

9. A magnetic tape head module prepared by a process comprising:
    depositing over a wafer substrate one or more electrical traces from respective one or more electrical lapping guides to an area at an end of said tape head module formed over said substrate;
    fabricating a closure adjacent to magnetic devices of said tape head module, wherein said closure terminates outside of said area at said end of said tape head module; and
    electrically connecting said electrical traces to an external circuit using a wire-bonding procedure, thereby electrically connecting each said electrical lapping guide to said external circuit.

10. The tape head module of claim 9, said process further comprising:
    depositing a plurality of electrical connection pads at said area at said end of said tape head module; and
    electrically connecting each said electrical trace to one of said electrical connection pads;
    wherein said electrically connecting said electrical traces to said external circuit includes wire-bonding said electrical connection pads to said external circuit.

11. The tape head module of claim 9, said process further comprising:
    lapping said tape head module using said electrical lapping guides for resistance feedback.

12. The tape head module of claim 11, wherein said lapping comprises a final precision-lapping process.

13. The tape head module of claim 12, wherein said final precision-lapping process fabricates a desired surface finish for said tape head module.

14. The tape head module of claim 11, wherein said lapping comprises an intermediate rough-lapping process.

15. A magnetic tape recording and playback device comprising:
    a tape head module prepared by a process comprising:
        depositing over a wafer substrate one or more electrical traces from respective one or more electrical lapping guides to an area at an end of said tape head module formed over said substrate;
        fabricating a closure adjacent to magnetic devices of said tape head module, wherein said closure terminates outside of said area at said end of said tape head module; and
        electrically connecting said electrical traces to an external circuit using a wire-bonding procedure, thereby electrically connecting each said electrical lapping guide to said external circuit.

16. The magnetic tape recording and playback device of claim 15, said process further comprising:
    depositing a plurality of electrical connection pads at said area at said end of said tape head module; and electrically connecting each said electrical trace to one of said electrical connection pads;
wherein said electrically connecting said electrical traces to said external circuit includes wire-bonding said electrical connection pads to said external circuit.

17. The magnetic tape recording and playback device of claim 15, said process further comprising:
lapping said tape head module using said electrical lapping guides for resistance feedback.

18. The magnetic tape recording and playback device of claim 17, wherein said lapping comprises a final precision-lapping process.

19. The magnetic tape recording and playback device of claim 18, wherein said final precision-lapping process fabricates a desired surface finish for said tape head module.

20. The magnetic tape recording and playback device of claim 15, wherein said lapping comprises an intermediate rough-lapping process.

\* \* \* \* \*